(12) United States Patent
Meng et al.

(10) Patent No.: US 7,483,868 B2
(45) Date of Patent: Jan. 27, 2009

(54) AUTOMATIC NEURAL-NET MODEL GENERATION AND MAINTENANCE

(75) Inventors: Zhuo Meng, Broadview Heights, OH (US); Yoh-Han Pao, Cleveland Heights, OH (US)

(73) Assignee: Computer Associates Think, Inc., Islandia, NY (US)

( * ) Notice: Subject to any disclaimer, the term of this patent is extended or adjusted under 35 U.S.C. 154(b) by 794 days.

(21) Appl. No.: 10/374,406

(22) Filed: Feb. 26, 2003

(65) Prior Publication Data

US 2003/0200189 A1 Oct. 23, 2003

Related U.S. Application Data

(60) Provisional application No. 60/373,780, filed on Apr. 19, 2002, provisional application No. 60/373,977, filed on Apr. 19, 2002, provisional application No. 60/374,020, filed on Apr. 19, 2002, provisional application No. 60/374,024, filed on Apr. 19, 2002, provisional application No. 60/374,041, filed on Apr. 19, 2002, provisional application No. 60/374,064, filed on Apr. 19, 2002.

(51) Int. Cl.
*G06F 15/18* (2006.01)
(52) U.S. Cl. .......................... 706/26; 706/23
(58) Field of Classification Search .............. 706/26, 706/23
See application file for complete search history.

(56) References Cited

U.S. PATENT DOCUMENTS

| 4,193,115 | A | 3/1980 | Albus |
|---|---|---|---|
| 4,215,396 | A | 7/1980 | Henry et al. |
| 4,438,497 | A | 3/1984 | Willis et al. |
| 4,649,515 | A | 3/1987 | Thompson et al. |
| 4,663,703 | A | 5/1987 | Axelby et al. |
| 4,670,848 | A | 6/1987 | Schramm |
| 4,740,886 | A | 4/1988 | Tanifuji et al. |
| 4,754,410 | A | 6/1988 | Leech et al. |
| 4,858,147 | A | 8/1989 | Conwell |
| 4,928,484 | A | 5/1990 | Peczkowski |
| 4,972,363 | A | 11/1990 | Nguyen et al. |
| 4,979,126 | A | 12/1990 | Pao et al. |
| 4,994,982 | A | 2/1991 | Duranton et al. |
| 5,023,045 | A | 6/1991 | Watanabe et al. |
| 5,033,006 | A | 7/1991 | Ueda et al. |
| 5,052,043 | A | 9/1991 | Gaborski |
| 5,111,531 | A | 5/1992 | Grayson et al. |
| 5,113,483 | A | 5/1992 | Keeler et al. |
| 5,119,468 | A | 6/1992 | Owens |

(Continued)

OTHER PUBLICATIONS

Hai-Lung Hung et al., Dynamic Hierarchical Self- Organizing Neural Networks, 1994, 0-7803-1901-X/94 IEEE.*

(Continued)

*Primary Examiner*—David R Vincent
*Assistant Examiner*—Nathan H Brown, Jr.
(74) *Attorney, Agent, or Firm*—Baker Botts L.L.P.

(57) ABSTRACT

Method of incrementally forming and adaptively updating a neural net model are provided. A function approximation node is incrementally added to the neural net model. Function parameters for the function approximation node are determined and function parameters of other nodes in the neural network model are updated, by using the function parameters of the other nodes prior to addition of the function approximation node to the neural network model.

39 Claims, 7 Drawing Sheets

Linear summation output

Linear weights

Non-linear functional-link layer

U.S. PATENT DOCUMENTS

| | | | |
|---|---|---|---|
| 5,140,523 A | | 8/1992 | Frankel et al. |
| 5,142,612 A | | 8/1992 | Skeirik |
| 5,175,678 A | | 12/1992 | Frerichs et al. |
| 5,175,797 A | | 12/1992 | Funabashi et al. |
| 5,247,445 A | | 9/1993 | Miyano et al. |
| 5,311,421 A | | 5/1994 | Nomura et al. |
| 5,335,291 A | | 8/1994 | Kramer et al. |
| 5,349,541 A | | 9/1994 | Alexandro et al. |
| 5,485,390 A | | 1/1996 | LeClair et al. |
| 5,682,465 A | * | 10/1997 | Kil et al. ............. 706/25 |
| 5,734,796 A | | 3/1998 | Pao |
| 5,822,741 A | * | 10/1998 | Fischthal ............. 706/16 |
| 5,835,901 A | | 11/1998 | Duvoisin, III et al. |
| 5,848,402 A | | 12/1998 | Pao et al. |
| 6,128,609 A | | 10/2000 | Rose |
| 6,134,537 A | | 10/2000 | Pao et al. |
| 6,269,351 B1 | | 7/2001 | Black |
| 6,327,550 B1 | | 12/2001 | Vinberg et al. |

OTHER PUBLICATIONS

Henrique et al., Model structure determination in neural network models, 2000, Elsevier Science Ltd.*

Wlodzislaw Duch et al., Survey of Neural Transfer Functions, 1999, Neural Computing Surveys 2, 163-212.*

Runtime Software, "Pythia—The Neural Network Designer", 2000.*

Javier Herrero et al., A hierarchical unsupervised growing neural network for clustering gene expression patterns, Bioinformatics, vol. 17, No. 2, 2001, pp. 126-136.*

Hassoun, Fundamentals of Artificial Neural Networks, 1995, MIT Press, p. 46.*

Fahlman et al., "The Cascade-Correlation Learning Architecture", 1990.*

Hassoun, "Fundamentals of Artificial Neural Networks", 1995, pp. 103-106.*

Surajit Chaudhuri, Usama Fayyed and Jeff Bernhardt, "Scalable Classification over SQL Databases", *Proceedings of the 15th International Conference on Data Engineering*, Mar. 23-26, 1999, Sidney, Australia, pp. 470-479.

Dennis T. Lee, Yoh-Han Pao and Dejan J. Sobajic "Dynamic System Control Using Neural Networks", pp. 25-30.

Yoh-Han Pao "Neural Net Computing For Patter Recognition" *Handbook of Pattern Recognition, and Computer Vision*, pp. 125-162 (edited by C.H. Chen, L.F. Pau and P.S.P. Wang), (1993).

Bernard Widrow, Narendra K. Gupta, and Sidhartha Maitra (Sep. 1973) "Punish/Reward: Learning With a Critic in Adaptive Threshold Systems", *IEEE Trans. Systems, Man and Cybernetics*, vol. SMC-3, No. 5, pp. 455-465.

John A. Hartigan, (1975) "Interpretation and Evaluation of Clusters", *Clustering Algorithms*, pp. 12-14.

Yoh-Han Pao and Dejan J. Sobajic (1987) "Metric Synthesis and Concept Discovery With Connectionist Networks", 1987 IEEE, pp. 390-395.

Bernard Widrow and Rodney Winter (Mar. 1988) "Neural Nets for Adaptive Filtering and Adaptive Pattern Recognition", *IEEE Computer*, pp. 25-39.

Bernard Widrow, Rodney G. Winter, and Robert A. Baxter (Jul. 1988) "Layered Neural Nets for Pattern Recognition", *IEEE Trans. Acoustics, Speech, and Signal Processing*, vol. 36, No. 7, pp. 1109-1118.

Yoh-Han Pao, (1989) *Adaptive Pattern Recognition and Neural Networks*.

Andrew G. Barto (1990) "Connectionist Learning for Control", *Neural Networks for Control*, pp. 5-58 (edited by W. Thomas Miller, III, Richard S. Sutton and Paul J. Werbos).

R.D. Coyne and A.G. Postmus (1990) "Spatial Applications of Neural Networks in Computer-aided Design", *Artificial Intelligence in Engineering*, 5(1):9-22.

Kumpati S. Narendra and Kannan Parthasarathy (Mar. 1990) "Identification and Control of Dynamical Systems Using Neural Networks", *IEEE Trans. Neural Networks*, vol. 1, No. 1, pp. 4-27.

Maryhelen Stevenson, Rodney Winter, and Bernard Widrow (Mar. 1990) "Sensitivity of Feedforward Neural Networks to Weight Errors", *IEEE Trans. Neural Networks*, vol. 1, No. 1, pp. 71-80.

Esther Levin, Naftali Tishby, and Sara A. Solla (Oct. 1990) "A Statistical Approach to Learning and Generaliation in Layered Neural Networks", *Proc. IEEE*, vol. 78, No. 10, pp. 1568-1574.

Les Atlas, Jerome Connor and Mark Damborg (1991) "Comparisons of Conventional Techniques and Neural Networks in Computer-aided Design", Artificial Intelligence in Engineering, 5(1):9-22.

Miodrag Djukanoc, Borivoje Babic, Dijan J. Sobajic and Yoh-Han Pao (1991) "Unsupervised/Supervised Learning Concept for 24-Hour Load Forecasting", *Artificial Intelligence in Engineering*, pp. 819-827.

M.M. Gupta and J. Qi (1991) "Fusion of Fuzzy Logic and Neural Networks with Applications to Decision and Control Problems", *Proceedings of the 1991 American Control Conference*, pp. 1:30-31.

Jocelyn Sietsma and Robert J. F. Dow (1991) "Creating Artificial Neural Networks That Generalize", *Neural Networks*, vol. 4, pp. 67-79.

Petros A. Ioannou and Aniruddha Datta (Dec. 1991) "Robust Adaptive Control: A Unified Approach", *Proc. IEEE*, vol. 79, No. 12, pp. 1736-1768.

S.A. Billings, H.B. Jamaluddin and S. Chen (1992) "Properties of neural networks with applications to modeling non-linear dynamical systems", *Int. J. Control*, pp. 55(1):193-224.

John Doleac, Jeff Getchiud, Judy Franklin and Chuckk Anderson (1992) "Nadaline Connectionist Learning vs. Linear Regression at a Lamp Manufacturing Plant", *Proceedings of The First IEEE Conference on Control Applications*, pp. 552-558.

William Finnoff, Ferdinand Hergert, and Hans Georg Zimmerman (1993) "Improving Model Selection by Nonconvergent Methods", *Neural Networks*, vol. 6, pp. 771-783.

Andreas Ikonomopoulos, Lefteri H. Tsoukalas and Robert E. Uhrig (1993) "A Hybrid Neural Networ-Fuzzy Arithmetic Methodology For Performing Virtual Measurements in a Complex System", *Proceedings of the Thirty-Sixth Power Instrumentation Symposium*, pp. 205-212.

Michael Nikolaou (1993) "Neural Network Modeling of Nonlinear Dynamical Systems", *Proceeding of the 1993 American Control Conference*, pp. 1460-1464.

Stevan V. Odri, Dusan P. Petrovacki, and Gorana A. Krstonosic (1993) "Evolutional Development of a Multilevel Neural Network", *Neural Networks*, vol. 6, pp. 583-595.

Yoh-Han Pao and Gwang-Hoon Park (1993) "Neural-Net Computing for Machine Recognition of Handwritten English Language text", *Fundamentals of Handwriting Recognition*, pp. 335-351.

Mujeeb M. Ahmed (1994) "An Integrated Approach to Distributed Intelligent Control", *Proceeding of the Thirty-Seventh Power Instrumentation Symposium*, pp. 1-15.

Timothy J. Graettinger, Naveen V. Bhat and Jeffrey S. Buck (1994) Adaptive Control with NeuCOP, the Neural Control and Optimization Package, *IEEE*, pp. 2389-2393.

Yoh-Han Pao (1994) "Process Monitoring and Optimization for Power Systems Applications", *IEEE International Conference on Neural Networks*, pp. 3697-3702.

Perez P.C. Yip and Yoh-Han Pao (1994) "A Guided Evolutionary Computation Technique as Function Optimizer", *Proceeding of First IEEE Conference on Evolutionary Computation*, pp. 628-633.

Stuart J. Russell and Peter Norvig (1995) "Learning From Observations", *Artificial Intelligence: A Modern Approach*, pp. 525-562.

Mattias Nyberg and Yoh-Han Pao (1995) "Automatic Optimal Design of Fuzzy Systems Based on Universal Approximation and Evolutionary Programming", *Fuzzy Logic And Intelligent Systems*, pp. 311-366 (edited by H.L. Hua and M. Gupta).

Percy P.C. Yip and Yoh-Han Pao (1995) "Combinatorial Optimization with Use of Guided Evolutionary Simulated Annealing", *IEEE Transaction on Neural Networks*, 6(2):290-295.

Yoh-Han Pao (1996) "Dimension Reduction Feature Extraction and Interpretation of Data With Network Computing", *International Journal of Patter Recogntion and Artificial Intelligence*, pp. 10(5)521-253.

Yoh-Han Pao and Zhou Meng (1996) "A Perspective on Functional-Link Computing, Dimension Reduction and Signal-Image Understanding", *Proceedings of 1996 IEEE Signal Processing Society Workshop*, pp. 213-222.

Michael J. A. Berry and Gordon Linoff, (1997) *Data Mining Techniques For Marketing, Sales and Customer Support*, Chapters 2, 5, and 12, pp. 17-35, 63-93 and 243-285.

Floriana Esposito, Donato Malerba and Giovanni Semeraro, (May 1997) "A Comparative Analysis Of Methods For Pruning Decision Trees", *IEEE Transaction on Pattern Analysis and Machine Intelligence*, 19(5):476-491.

Byung Hwan Jun, Chang Soo Kim, Hong-Yeop Song and Jaihie Kim, (Dec. 1997) "A New Criterion in Selection and Discretization of Attributes for the Generation of Decision Trees", *IEEE Transaction on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M. Fayyad and Cory A. Reina, (Jun. 1998) "Scaling Clustering Algorithms to Large Databases", Proc. 4th Int'l Conf. Knowledge Discovery & Data Mining, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J. A. Berry and Gordon Linoff, (2000) *Mastering Data Mining The Art and Science of Customer Relationship Management*, pp. 59-64 and 111-121.

Timo Koskela (2000) "Decision Trees", http://www.hut.fi/~timoko/treeprogs.html.

Zhou Meng and Yoh-Han Pao (2000) "Visualization and Self-Organization of Multidimensional Data through Equalized Orthogonal Mapping", IEEE Transaction on Neural Networks, pp. 11(4):1031-1038.

\* cited by examiner

Linear summation output

Linear weights

Non-linear functional-link layer

AUTOMATIC NEURAL-NET MODEL GENERATION AND MAINTENANCE

CROSS-REFERENCE TO RELATED APPLICATIONS

This application claims the benefit of the following commonly assigned, provisional applications:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS"; and (f) Ser. No. 60/373,780, filed Apr. 19, 2002 and entitled "USING NEURAL NETWORKS FOR DATA MINING".

TECHNICAL FIELD

This application relates to neural nets. In particular, the application relates to neural net model building and maintenance.

DESCRIPTION OF RELATED ART

Humans use their abilities of pattern recognition in many things they do, and particularly to solve problems. The following are some examples of how people use pattern recognition to anticipate and/or detect problems and find solutions to the problems:

(a) an experienced manager, based on her experience and knowledge of customers' buying patterns and her observations of current conditions (for example, weather, day of the week, date, local economy, etc.), predicts the number of units of a merchandise that should be ordered for the upcoming month; and (b) a brewmaster samples his product over time and his intuition and experience suggests to him changes to the ingredients or process he should make to improve the product.

Artificial neural network ("neural net") techniques provide an information processing tool, with similar pattern recognition capabilities, which may be trained to provide an input-output model for assorted applications.

A typical neural net comprises a number of interconnected neuron-like processing elements (or nodes) that send data to each other along connections. A processing element receives a number of inputs, either from other processing elements or directly from inputs of the network, and multiplies each of the inputs by a corresponding weight and adds the results together to form a weighted sum. It then applies a transfer function (also referred to herein as "activation function" and "basis function") to the sum to obtain a value known as the state of the element. The state is then either passed on to one or more other processing elements along weighted connections, or provided as an output of the network. Collectively, states are used to represent information in the short term, while weights represent long-term information or learning.

Processing elements in a neural net may be organized into layers. For example, a multi-layer hidden-layer net has an input layer, an output layer and one or more hidden layers between the input layer and output layer. The outputs of the input layer are passed to one of the hidden layers. Generally, hidden layer processing elements allow the network to build intermediate representations which combine input data in ways that help the neural net model to learn the desired input-output mapping with greater accuracy through training. Outputs of the hidden layers are passed to the output layer, and the output layer produces one or more outputs.

Training is a process through which neural nets learn an input-output model through exposure to data and adjustment of the weights associated with connections between processing nodes. A training process may involve the following steps:

1) Repeatedly presenting examples of a particular input/output task to the neural net model;

2) Comparing the model output and a desired output to measure error; and

3) Modifying model weights to reduce the error.

This process is repeated until further iteration fails to decrease the error (or the error falls below a predetermined minimum). The network then is said to be "trained".

Through training with, for example, training sets of sample data, neural nets can learn to extract relationships from the data, similar to the way that humans learn from experience, and, when in operation (often also called "consultation"), recall the learned relationships in order to extrapolate suitable solutions in new situations (for example, not expressly represented in the training data). Training a neural net by applying sets of specific, selected samples helps the network to develop a general input-output model. The trained model is expected to output for each input pattern one or more output values associated with the input pattern, while maintaining the appearance of a blackbox (i.e. the details or inner workings, such as weights and nodes, within the trained model are not readily apparent to a user or observer).

Selecting an appropriate net structure plays a substantial role in building a neural net computational model of a functional relationship or system. If it is assumed that no prior knowledge of the problem is known and therefore only commonly-used node activation functions are used, the issues in the neural net generation process include the following. First, a net type (for example, layers in the net) are selected. Once the net type is selected, one determines an appropriate number and connectivity of nodes in the net as well as node parameters.

FIG. 1 shows a plot of training error versus number of nodes (ranging from one to twenty) in a hidden layer of a conventional single hidden-layer net, for a sample data set of seven inputs and one output. As exemplified in FIG. 1, there is often no observable relationship between the training error and the number of hidden-layer nodes. The number of nodes used in a conventional neural net model typically is determined by experience and trial-and-error, which of course is not suitable for automatic model building.

In addition, conventional neural nets are not conducive to incremental and/or adaptive learning. The term "incremental learning", as used herein, means that (a) the net can be expanded with new nodes added and (b) computation of a new set of weights for the expanded net utilizes the weights from before the expansion as a starting point rather than starting from scratch. The term "adaptive learning", as used herein, means that after a neural net model has been established, additional data can be used to update the model to achieve better overall results. For example, neither incremental learning nor adaptive learning can be achieved efficiently by a hidden-layer net because the nonlinear processing by a hidden-layer net is widely distributed and interconnected across the nodes, and therefore any adjustments to the weights based on determined error also must be nonlinearly distributed.

Therefore, neural net model generation and maintenance methodologies which facilitate incremental and adaptive learning are needed.

SUMMARY

The disclosure provides a method of incrementally forming and adaptively updating a neural net model. According to one embodiment, the method includes (a) incrementally adding to the neural net model a function approximation node, and (b) determining function parameters for the function approximation node and updating function parameters of other nodes in the neural network model, by using the function parameters of the other nodes prior to addition of the function approximation node to the neural network model. Steps (a) and (b) may be repeated, if a model accuracy of the neural net model with the function approximation node added thereto is below a predetermined accuracy level.

According to one embodiment, a set of sample data patterns is used to form a list of function approximation node candidates, and the function approximation node is selected from the list of function approximation node candidates. The list of function approximation node candidates may be formed by splitting the set of sample data patterns into a plurality of clusters in a first level of a cluster hierarchy, determining that a selected cluster in the first level has a population exceeding a predetermined size, and splitting the selected cluster into two or more clusters and replacing the selected cluster with the two or more clusters in a next level of the cluster hierarchy. The clusters on each level of the cluster hierarchy based on cluster size, to form a sorted list of function approximation node candidates.

The function parameters for the nodes in the neural net model may be determined by applying a hierarchical k-means clustering methodology to a set of sample data patterns. For example, a function approximation node may be a radial basis node, and a center and radius of the radial basis node are determined through a hierarchical k-means clustering methodology.

The method may further include monitoring a model accuracy of the neural net model while the neural net model is used on-line, and adaptively updating the neural net model, if the model accuracy of the neural net model is below a predetermined threshold. The adaptive update may include incrementally adding one or more additional nodes to the neural net model, to represent new data. The new data may correspond to a data range not represented in the set of sample data patterns and/or to a change in system dynamics. The adaptive update may include updating the function parameters of the nodes in the neural net model. If the adaptive updating reaches a limit, a full retrain of the neural net model may be performed.

The additional nodes, according to one embodiment, may be formed by applying a clustering methodology to new data patterns. The clustering methodology may include, for example, clustering the new data patterns into a number of clusters which is approximately a number of the nodes in the neural net model, determining that a selected cluster is far away from positions associated with the respective nodes in the neural net model, and adding to the neural net model an additional node associated with the selected cluster and a center of the selected cluster.

An orthogonal least squares methodology may be applied to determine a set of weights for the neural net model. The set of weights may be adaptively updated by using new data patterns and/or to compensate for system drift. The weights of the nodes in the neural net model prior to the adaptive update may be combined with a set of new weights based on a forgetting factor. The forgetting factor may be determined based on a cause of model degradation.

The present disclosure also provides a method of incrementally forming a neural net model. In one embodiment, the method includes applying a hierarchical clustering methodology to a set of sample data patterns to form a list of function approximation node candidates; and incrementally applying function approximation nodes from the list of function approximation node candidates to form a model with an accuracy at or above a selected accuracy level.

According to another embodiment, the method includes forming a plurality of function approximation nodes for the neural net model by applying a hierarchical clustering methodology to a set of sample data patterns, and applying an orthogonal least squares methodology to determine a set of weights associated with the function approximation nodes.

BRIEF DESCRIPTION OF THE DRAWINGS

The features of the present disclosure can be more readily understood from the following detailed description with reference to the accompanying drawings wherein.

DETAILED DESCRIPTION

This disclosure provides tools (in the form of methodologies and systems) for neural net model generation and maintenance. Novel incremental and/or adaptive methodologies for efficiently building adequately accurate neural net models of mappings learned through training and for maintaining the accuracy of the models are provided. The incremental methodologies described herein provide efficiency, as compared with other approaches, and the adaptive methodologies are exercised in response to changes in a nature of the data or in the system response.

In accordance with one embodiment, efficient incremental improvement of a model encompasses addition of nodes in an appropriate manner and computation of improved system model parameters recursively from the previously learned model, which is thus improved incrementally.

In accordance with another embodiment, incremental learning includes adding nodes from an ordered candidate list sequentially based on guidance provided by hierarchical clustering. The architecture of the hierarchical clustering may be binary beyond the first level and may have a maximum number of levels. The candidate list may be generated by sorting the clusters first by level and then by cluster size. Nodes are selected from the sorted list starting with functions from top-level clusters. If accuracy of the model is not adequate, more nodes are added sequentially until all nodes in the candidate list are exhausted or until a desired accuracy is obtained. This methodology may be applied to obtain a model with adequate accuracy and having a moderate size.

Adaptive learning, in response to changes either in system dynamics or to range of data or both, includes, in accordance with one embodiment, a simple methodology for adjusting the network parameters and/or structure, without having to undergo a complete retrain. Under this methodology, clustering of new data is used to determine if new nodes should be added, and the top most linear weights for the existing nodes and for any new nodes generated are computed by using only the new data in combination with existing weights in the net, according to a "forgetting factor" based on a determination of a cause of degradation in performance of the original model and also on number of patterns used for training.

An embodiment of the present disclosure may use a combination of hierarchical clustering, radial basis function, and linear orthogonal least squares methodologies to provide incremental model building and adaptive maintenance.

Figure 2A:
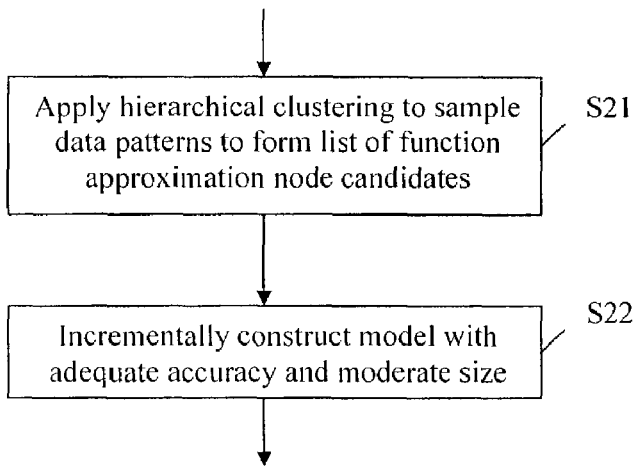
FIG. 2A shows a flow chart for a method of incrementally forming a neural net model, in accordance with one embodiment of the present disclosure.

An exemplary method for incrementally forming a neural net model, in accordance with one embodiment of the present disclosure, is described with reference to FIG. 2A. A hierarchical clustering methodology is applied to a set of sample data patterns to form a list of function approximation node candidates (step S21). Function approximation nodes selected from the list of function approximation node candidates are incrementally added to the neural net model to form a model with an accuracy at or above a selected accuracy level (step S22).

The method of incrementally forming a neural net model, according to another embodiment, includes applying a hierarchical clustering methodology to a set of sample data patterns to form a list of function approximation node candidates, and incrementally adding to the neural net model one or more function approximation nodes selected from the list of function approximation node candidates, until a model with an accuracy at or above a selected accuracy level is obtained. The function approximation node candidates may include Gaussian nodes, sigmoidal basis nodes, wavelet basis nodes, etc. The nodes may be non-linear.

A hierarchical clustering methodology, according to one exemplary embodiment, is described with reference to FIG. 2B. The set of sample data patterns is split into a plurality of clusters in a first level of cluster hierarchy (step S211). Select a cluster in current (first) level and compare the population of the cluster to a predetermined size threshold (step S212). If the population of the cluster exceeds the threshold (step S213), the cluster is split into and replaced with two or more clusters in a next level of the cluster hierarchy (step S214). The process is repeated until no clusters exceeding the size threshold remain (step S215).

Figure 2B:
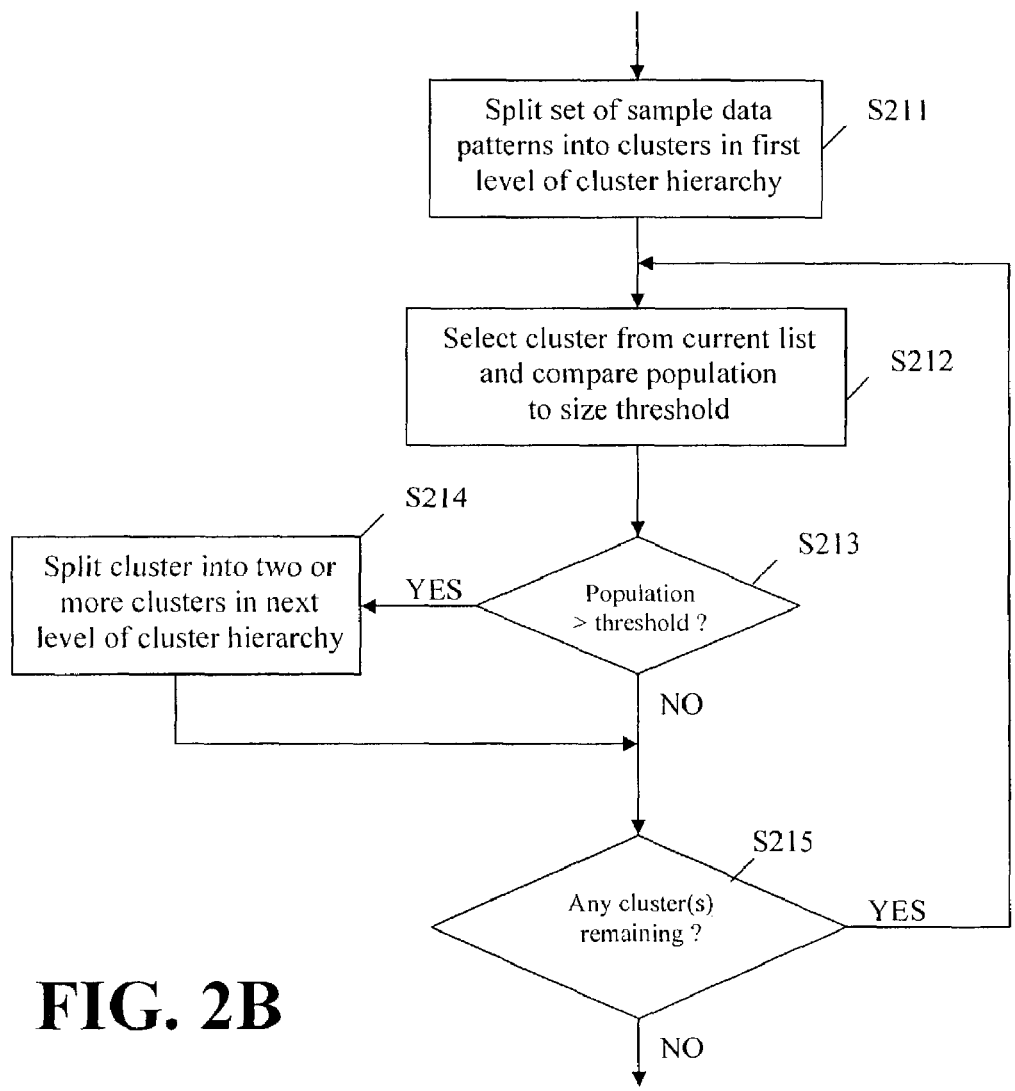
FIG. 2B shows a flow chart for a hierarchical clustering methodology, in accordance with one embodiment.

A method of generating an ordered list of candidate node functions, according to one exemplary embodiment (FIG. 2C), may use the methodology of FIG. 2B to develop a cluster hierarchy. When all remaining clusters are moderate-sized (e.g., population is below threshold) [steps S212-S215], a list of candidate node functions may be generated by sorting the clusters on each level of the cluster hierarchy, based on cluster size (step S216).

Figure 2C:
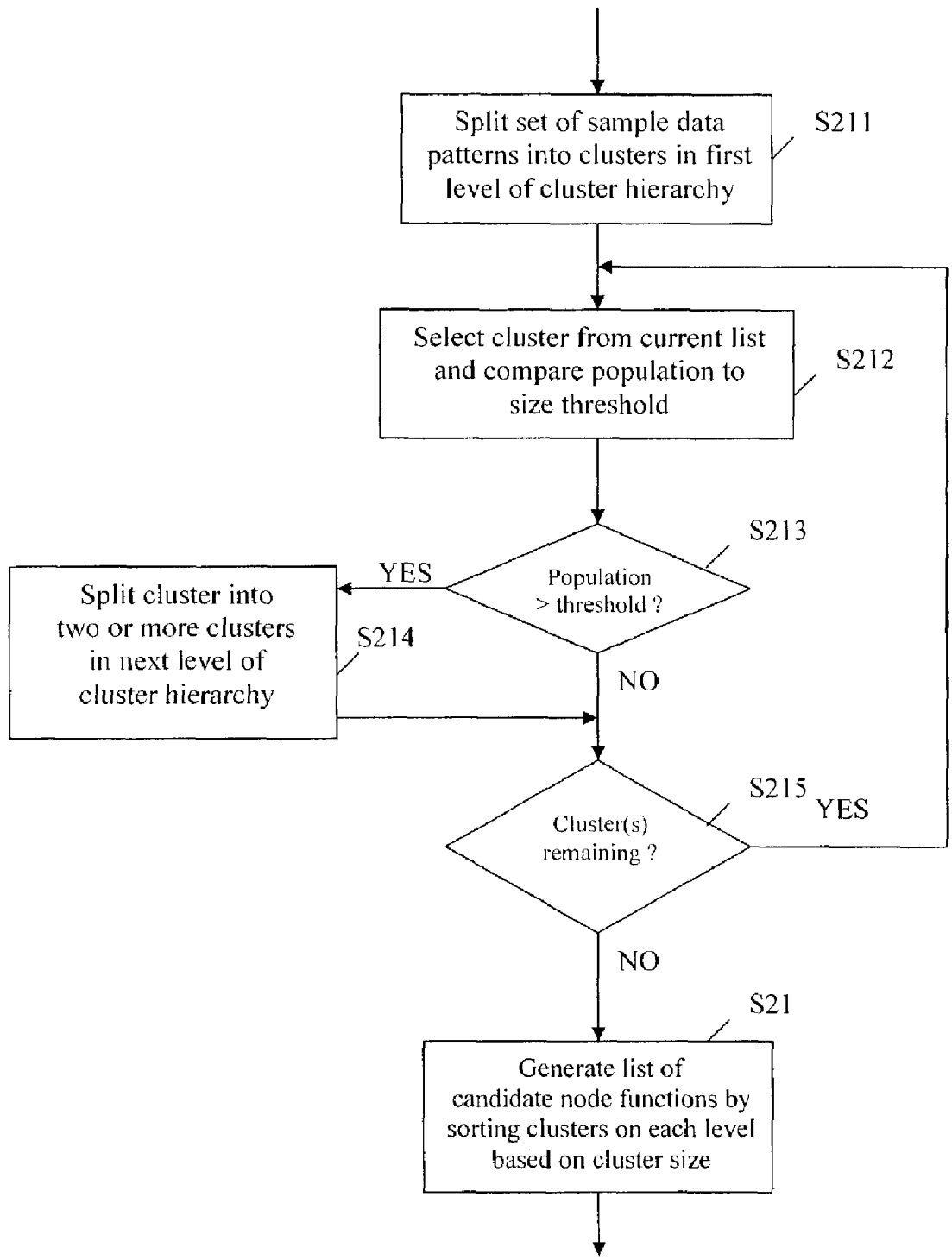
FIG. 2C shows a flow chart for a method of generating an ordered list of candidate node functions, according to one embodiment, using the hierarchical clustering methodology shown in FIG. 2B.
Figure 2D:
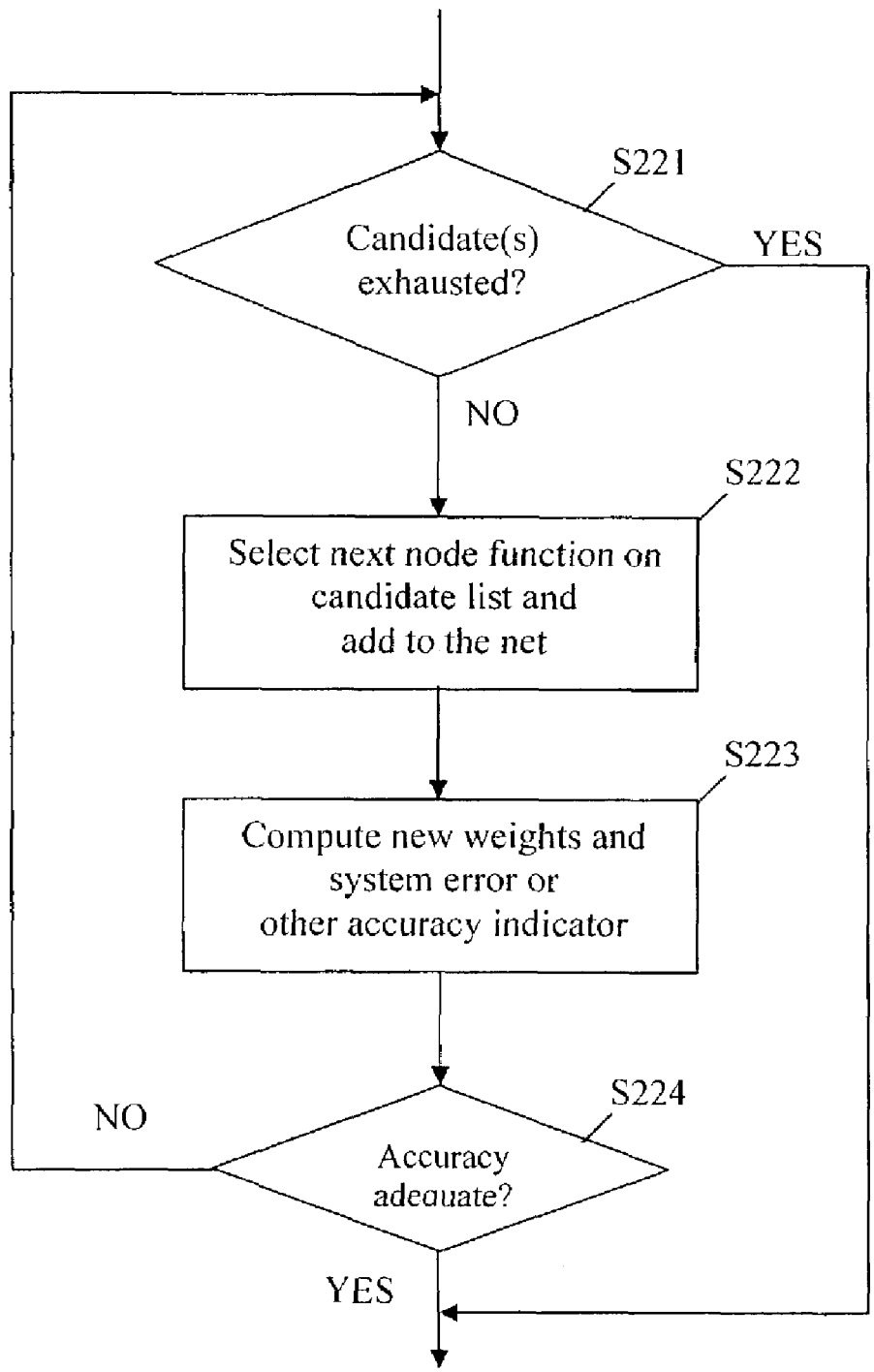
FIG. 2D shows a flow chart for a method of incrementally constructing a model, according to one embodiment, using a list of candidate node functions.

A method of incrementally constructing a moderately-sized model with adequate accuracy, in accordance with one embodiment (FIG. 2D), may use a list of candidate node functions generated by applying, for example, the methodology shown in FIG. 2C. If there are any node functions on the candidate list (step S221), the first node function on the list is selected and added to the model (step S222). New weights are computed, along with a system error (or other accuracy indicator (step S223). If the accuracy of the model is not adequate (step S224), the process returns to step S221 to process any candidate node functions remaining on the list.

Figure 3A:
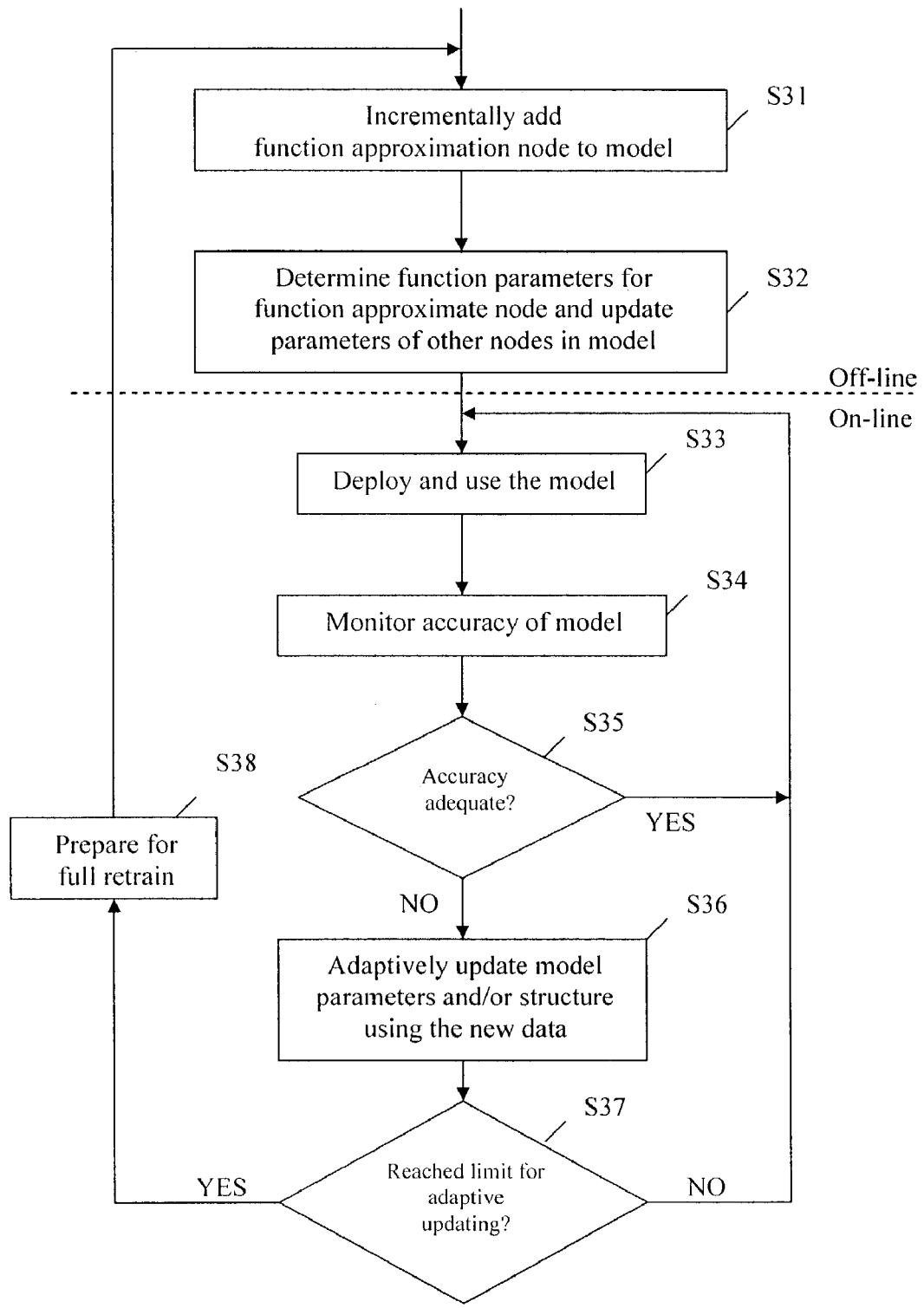
FIG. 3A shows a flow chart for a method of incrementally forming and adaptively maintaining a neural net model at an adequate accuracy level, according to one embodiment of the present disclosure.
Figure 3B:
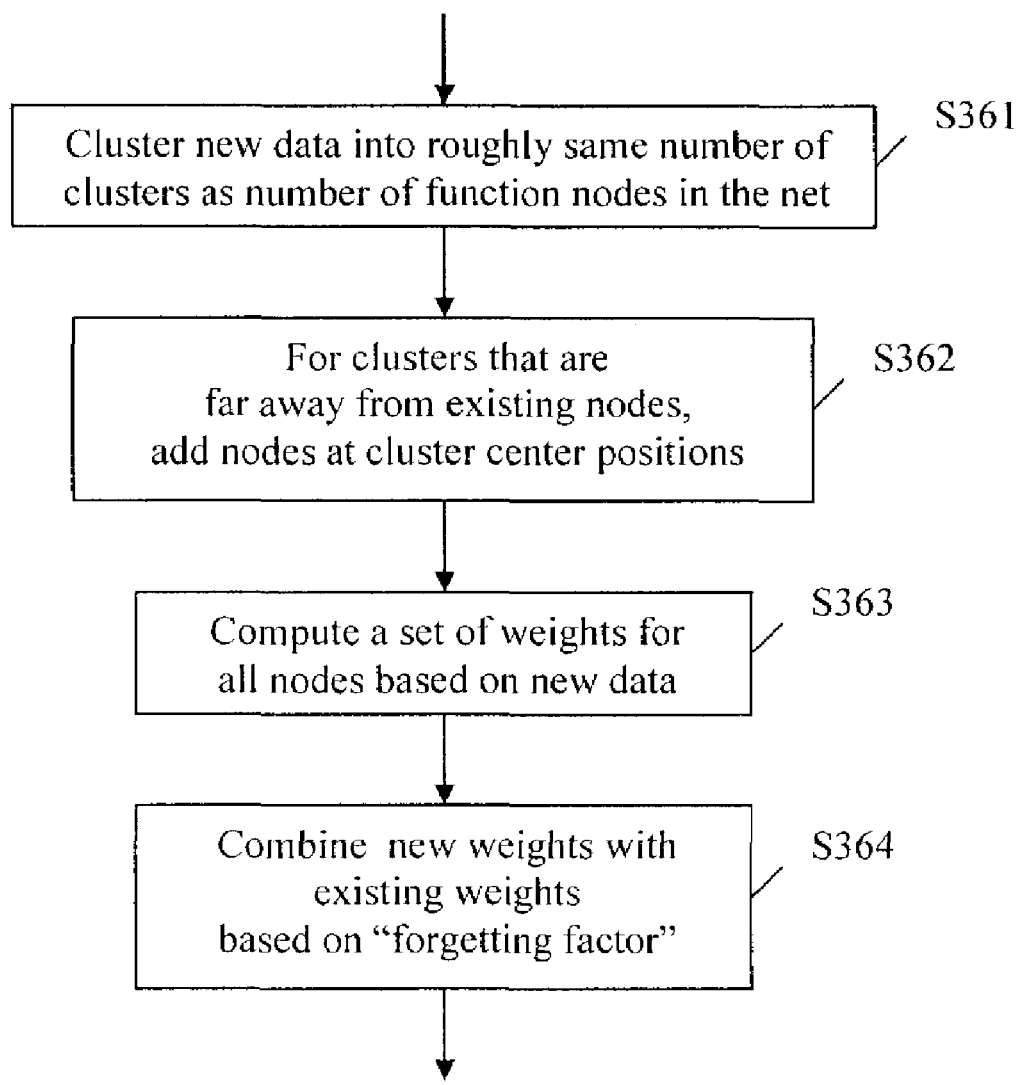
FIG. 3B shows a flow chart for a method of adaptively updating a model to maintain accuracy of the model, according to one embodiment, using new data.

A method, in accordance with another embodiment, for incrementally forming a neural net model off-line and adaptively maintaining the neural net model at an adequate accuracy level and a moderate size is described with reference to FIG. 3A. A function approximation node is incrementally added to the neural net model (step S31). Function parameters are determined for the function approximation node and function parameters of other nodes in the neural net model are updated, by using new data and the existing function parameters of the other nodes prior to addition of the function approximation node (step S32). Function approximation nodes may be added to the neural net model (steps S31 and S32) until the model has an adequate accuracy (see, for example, FIG. 2D). The model formed off-line may be deployed and used on-line (step S33). Accuracy of the model is monitored as new data is fed as input to the model (step S34). If the model is not adequately accurate (for example, meet a minimum level of accuracy) [step S35], model parameters and/or structure may be updated adaptively (step S36). The adaptive update may be necessitated, for example, by a change in system dynamics or by drift in the system. The neural net model may have poor accuracy for new data that is not represented by (for example, far away from) any of the clusters of sample data patterns which correspond to the function approximation nodes. In this latter instance, the adaptive update may use the new data to add additional nodes to the model. See, for example, FIG. 3B and corresponding discussion below.

If the limit for adaptive updating is reached (for example, accuracy is not improved through adaptive update) [step S37], preparation for full off-line retrain is performed (step S38), and then the process restarts at step S21. On the other hand, if the adaptive update improves the accuracy of the model (step S37), the adaptively updated model is redeployed and used on-line (step S33) and accuracy of the updated model is monitored (step S34).

A method of adaptively updating a model to maintain accuracy of the model (for example, step S36), according to one embodiment of the present disclosure (FIG. 3B), may be applied in response to, for example, new data corresponding to change in system dynamics and/or in range of data. The new data is clustered into roughly the same number of clusters as the number of current nodes in the model (step S361). For clusters that are far away from the current nodes in the model, corresponding new nodes are added at the positions of the cluster centers (and weights on output links of the new nodes may be initialized to zero) [step S362]. A set of new weights is computed for all (current and new) nodes based on the new data (step S363). The new weights are combined with the existing weights of the existing nodes by applying a forgetting factor (step S364). The forgetting factor may be selected based on, for example, a cause of degradation in model performance and/or on a number of training patterns.

Function parameters associated with the nodes in the neural net model may be generated by using a hierarchical k-means clustering methodology. For example, the nodes may include radial basis nodes, and the centers and radii of the radial basis nodes are determined through the hierarchical k-means clustering methodology.

Some neural nets may be trained to model or approximate a functional relationship between input and output, without requiring training with every possible input pattern. A relationship between input and output is described as "functional" to signify that the input-output relationship can be approximated by a mathematical function, for example, for each input pattern the input pattern has only one associated output value (e.g., if inputs x and y are 4 and 5, output z is always 9; if x and y are 94 and 73, z is always 26; etc.).

The functional relationship may be linear or non-linear. Linearity is a mathematical property (applicable, for example, to a relationship between input and output of a function) that output (y) is proportionally related to input (x) [for example, y=2x, y=5−4x, etc.], such that a small/large change in input produces a corresponding small/large change in output. Once it is known that a problem embodies a linear relationship between variables, the linear factor may be determined numerically, empirically and/or methodically through well-known methods. However, in real life, the relationship between independent variables in a mathematical problem is typically non-linear (i.e. there is not such a fixed ratio). Therefore, in order for a neural net to be a universal approximator (which means that a network can be used to approximate any function to arbitrary precision when enough nodes are provided win the net), the neural net should be capable of modeling non-linear input-output relationships. Some neural nets may be trained to capture nonlinearity and interactions among independent variables automatically without pre-specification.

Figure 1:
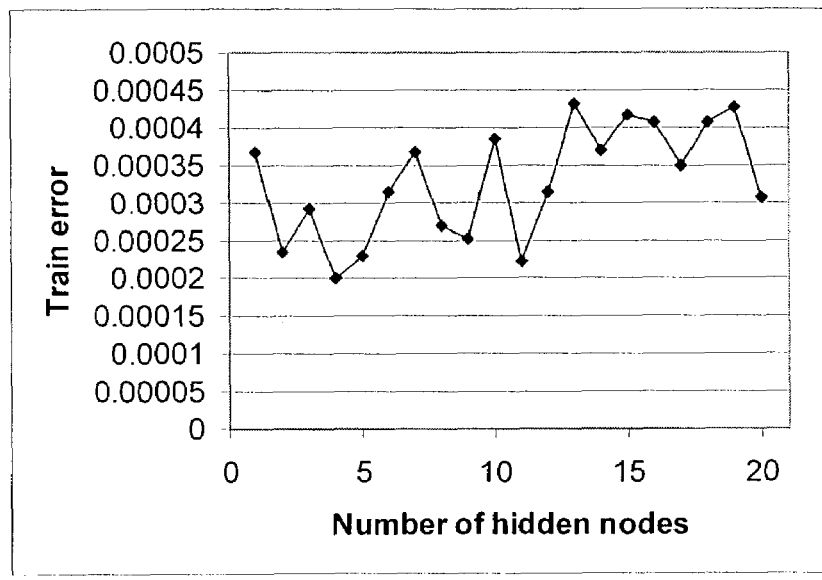
FIG. 1 shows a graphical representation of a plot of training error versus number of nodes in a hidden layer of a single-layer hidden-layer net.
Figure 4:
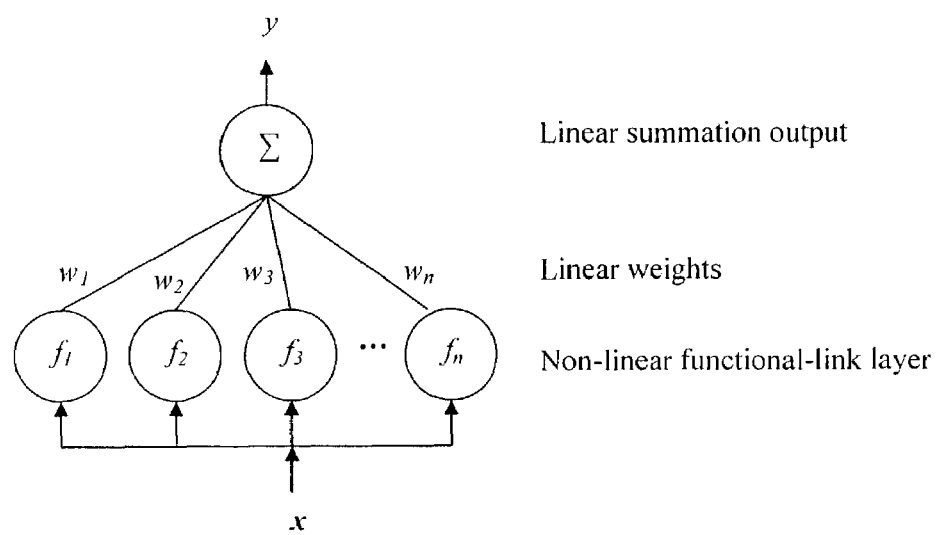
FIG. 4 shows a schematic view of a functional link net structure.

A functional-link net ("FLN") is one type of neural net which can be used to model a functional relationship between input and output. A FLN may be used to approximate any scalar function with a vector of inputs, x, and an output y. The structure of a FLN with non-linearity fully contained in a functional-link layer is illustrated in FIG. 4. The nodes in the functional-link layer have associated non-linear basis functions. Examples of FLNs are described in commonly owned U.S. Pat. Nos. 4,979,126, 5,734,796, 6,134,537 and 6,212,509 which are incorporated herein in their entirety by reference. Since a vector function may be decomposed into scalar dimensions, and therefore may be approximated with multiple output nodes or multiple nets, the discussion of FLN in this disclosure focuses on the case of one output node, such as shown in FIG. 4, without loss of generality to cover the typical circumstance in which there are multiple output nodes.

Hidden-layer nets and FLNs are two types of neural nets that can serve as universal approximators. However, a location of the non-linearity is different for the two types of nets. For a multi-layer hidden-layer net, the activation function for the hidden-layer nodes typically is non-linear. Although all the weights are linear weights, any methodology used to train such a net has to be non-linear. On the other hand, when a FLN is used, non-linearity may be fully contained in the functional-link layer, and the rest of the net may be linear. Therefore, linear training techniques such as regression-based training may be used with a FLN structure. Linear training refers to techniques that solves the parameters in the net through linear algebra techniques.

Although both types of nets (i.e., multi-layer hidden-layer net and functional-link net) may be universal approximators, how many nodes is enough varies according to the data and/or the problem. Further, since the initial set of weights and/or function parameters in the net are usually randomly generated, the resulting trained net is usually just a local minimum in the error space (e.g., the associated error appears to be at a minimum). A result of a trained net being at a local minimum is that adding one more node may not reduce the model error at all, if one does not try a significant number of different initial weights and/or sets of parameter values. This is less of a problem for the linearly trainable FLN, unless the randomly generated parameter values cause the linear problem to be close to singular (e.g., with an undefined mathematical derivative at some point in the problem space). Therefore, the problem of training error settling to a local minimum is much more noticeable and likely to occur with hidden-layer nets.

The neural net model generation and maintenance methodologies of the present disclosure (referred collectively herein as "orthogonal functional-link net methodologies" or "OFLN methodologies") may be applied to generate, in accordance with a preferred embodiment, an efficient, high-performance function approximation neural net. The OFLN methodologies also include provisions for maintenance of the subject net so that the net can be automatically updated in accordance with data obtained from the system being modeled.

A FLN with linear output nodes is selected as the net type under the OFLN methodologies. An advantage of a FLN is that linear regression training techniques, such as an orthogonal least squares (OLS) learning methodology (discussed below), can be used to achieve incremental and adaptive learning.

Under the OFLN methodologies, the appropriate number of function approximation nodes are considered together with the parameters of the nodes. For radial-basis function approximation nodes (discussed below), the parameters include the location of the center and for some cases the effective radius. One may use a heuristic radius in combination with random centers, or place centers on randomly selected existing patterns. A drawback, however, is that it may be difficult to determine the quality of the parameters in terms of their ability to represent the available data. Therefore, multiple trials and/or user experience, i.e. heuristics specific to a problem, may be necessary to arrive at a good model. Under the OFLN methodologies, the data speak for themselves, that is, the candidate center and radii values are generated through hierarchical clustering (discussed below).

Combining the advantages of radial-basis FLN, hierarchical clustering and the orthogonal least squares methodology, the OFLN methodologies may be applied to provide automatic generation of suitable models of a system if a set of training data is available. The model created by the OFLN methodologies may also be updated adaptively. The combination of effective model building, which may be performed periodically off-line as new data accumulate, and adaptive model updating, which may be carried out on-line as new data are available, provide the tools for maintaining optimal performance by the model.

The OFLN methodologies provide a number of features, including the following, which make the methodologies particularly suited for solving new and complex real-world problems:

(a) Learning: the subject methodologies develop solutions by extracting relationships from data, in a manner analogous to the way we learn from experience;

(b) Multi-dimensional: under the subject methodologies all the features of a problem may be considered at once, in parallel, in contrast to the human ability to analyze a finite number of data streams at once, and conventional sequential algorithms, which may require a great deal of complex programming to solve a problem that has many features;

(c) Non-linear: the subject methodologies are not bound to conventional modeling or problem solving techniques which require that some knowledge of the underlying nature of the problem is known or assumed in advance and the solution limited to that form; and (d) Adaptive: the model may readily be updated to accommodate new data, continuously improving its knowledge of the problem.

Orthogonal Least Squares Methodology

The orthogonal least squares (OLS) learning methodology is an incremental learning methodology.

A FLN may be trained to approximate the following scalar function, if a set of observed associated input-output pattern pairs $\{(x_p, y_p)\}$ is provided, where $p=1, \ldots, P$ (P being the number of pattern pairs):

$$y = y(x) \quad (1)$$

Using the net illustrated in FIG. 4, the following linear sum of a set of non-linear basis functions, $f_j(x)$ where $j=1, \ldots, J$ (J being the number of nodes), may be used to represent the approximation for the function in Equation (1):

$$y(x) = \Sigma w_j f_j(x) \quad (2)$$

Since Equation (2) is an approximation, there may be in addition an error term on the right hand side of the equation to make it a true equality. However, the error term is dropped in Equation (2) in the interest of clarity. Although radial basis functions such as Gaussians are frequently selected as $f_j(x)$ in Equation (2), other functions, such as sigmoids or wavelets, may also be used. Substituting the known patterns into Equation (2), P simultaneous equations are obtained. Since P (i.e., the number of pattern pairs) is usually much larger than J, (i.e., the number of function approximation nodes), the problem is over-specified and a solution can only be obtained in the sense of least sum of squares-of-error, or least squares.

If a training methodology based on least squares is used to train the net, the larger the number of basis functions used, the smaller the training error results, assuming the selected basis functions do not cause the resulting linear system to be nearly singular. However, the goal of course is to obtain an approximation that is truly representative of the implicit functional relationship. The trained net may be tested with the aid of a validation set (for example, a test set distinct from the training set) of patterns. Small errors for the training set patterns alone are not a satisfactory result of the learning process if a test with the validation set reveals that the learned relationship is not widely valid across the validation set (e.g., the learned relationship does not yield an appropriate output when an input pattern that is not in the training set is applied). Under such circumstances, incremental learning and/or adaptive learning techniques may be applied to refine the model.

The set of simultaneous equations obtained from Equation (2) may be written in matrix form, as follows:

$$\begin{bmatrix} f_1(x_1) & f_2(x_1) & \ldots & f_j(x_1) \\ f_1(x_2) & f_2(x_2) & \ldots & f_j(x_2) \\ \vdots & \vdots & & \vdots \\ f_1(x_p) & f_2(x_p) & \ldots & f_j(x_p) \\ \vdots & \vdots & & \vdots \\ f_1(x_p) & f_2(x_p) & \ldots & f_j(x_p) \end{bmatrix} \begin{pmatrix} w_1 \\ w_2 \\ \vdots \\ w_j \end{pmatrix} = \begin{pmatrix} y_1 \\ y_2 \\ \vdots \\ y_p \\ \vdots \\ y_p \end{pmatrix} \quad (3)$$

or $$Fw = y \quad (4)$$

Each of the non-linear functions $f_j(x)$ are described in terms of parameters. Though these parameters may also be varied in the training process, they usually are pre-selected and remain constant, while only the linear weights are adjusted, during the training process for such a net structure.

Using a linear least squares technique, a solution for Equation (4) may be expressed as follows:

$$w = (F^T F)^{-1} F^T y \quad (5)$$

However, in actual computation, the weight vector w is usually computed directly using singular value decomposition (SVD) or LU decomposition of $F^T F$ rather than the pseudo-inverse technique corresponding to Equation (5). The computation is straightforward if F is fixed. A problem arises when F is augmented during training as in the case of adding function approximation nodes dynamically. Direct computing of w may require a whole new SVD or LU decomposition of the augmented $F^T F$, although the only change in F is an added column.

In order to handle augmenting of F during training, the OLS methodology provides an extra step of orthogonalization. The extra step allows most of the results from a computation before F is augmented to be reused after F is augmented in, for example, a recursive fashion.

In Equation (4), each row of the matrix F is a representation of a single pattern vector in terms of the J basis functions. Accordingly, the matrix F is a representation of an entire set of P pattern vectors in terms of the J basis functions. The matrix F can also be considered as a row of column vectors $f_j$, as follows:

$$F = [f_1 f_2 \ldots f_j] \quad (6)$$

In the OLS methodology, a set of orthogonal vectors h may be built from the f vectors in the Gram-Schmidt manner as follows:

$$h_1 = f_1, h_2 = f_2 - C_{21} h_1 \quad (7)$$

$$h_k = f_k - \sum_{i=1}^{k-1} C_{ki} h_i$$

The coefficients $C_{ki}$ are determined by the following orthogonalization condition:

$$\langle h_i h_k \rangle = \langle h_i f_k \rangle - C_{ki} \langle h_i h_i \rangle = 0$$

so that $$C_{ki} = \langle h_i f_k \rangle / \langle h_i h_i \rangle \quad (8)$$

With this notation, the matrix F may be rewritten as follow:

$$F = HA \quad (9)$$

where A is an upper triangular matrix with the coefficients as its elements and ones on its diagonal.

Now Equation (4) may be rewritten as follows:

$$HAw = y \quad (10)$$

By denoting $$g = Aw \quad (11)$$

the set of simultaneous equations is transformed to the following:

$$Hg = y \quad (12)$$

The least squares solution for g is as follows:

$$g = (H'H)^{-1} H'y \quad (13)$$

where H'H is the following diagonal matrix:

$$H'H = \begin{pmatrix} h_1^t h_1 & 0 & \cdots & 0 \\ 0 & h_2^t h_2 & \cdots & 0 \\ \vdots & \vdots & \vdots & \vdots \\ 0 & 0 & \cdots & h_k^t h_k \end{pmatrix} \quad (14)$$

and therefore $(H'H)^{-1}$ is as follows:

$$(H'H)^{-1} = \begin{pmatrix} \frac{1}{h_1^t h_1} & 0 & \cdots & 0 \\ 0 & \frac{1}{h_2^t h_2} & \cdots & 0 \\ \vdots & \vdots & \vdots & \vdots \\ 0 & 0 & \cdots & \frac{1}{h_k^t h_k} \end{pmatrix} \quad (15)$$

If another h vector is added to the representation, the new g vector may be evaluated recursively as follows, which may be shown with straightforward linear algebra:

$$g_{k+1} = \left[ g_k \quad \frac{h_{k+1}^t y_{k+1}}{h_{k+1}^t h_{k+1}} \right]^t \quad (16)$$

The solution for w is then as follows:

$$w = A^{-1} g \quad (17)$$

Since A is an upper triangular matrix, the inverse matrix $A^{-1}$ may also be computed recursively as follows:

$$A_1^{-1} = [1] \quad (18)$$

$$A_1 = [1]$$

$$A_2 = \begin{pmatrix} 1 & C_{21} \\ 0 & 1 \end{pmatrix} = \begin{pmatrix} A_1 & C_{21} \\ 0 & 1 \end{pmatrix}$$

$$A_2^{-1} = \begin{pmatrix} A_1^{-1} & -A_1^{-1} C_{21} \\ 0 & 1 \end{pmatrix}$$

...

$$A_k = \begin{pmatrix} A_{k-1} & c_k \\ 0 & 1 \end{pmatrix} \text{ where } c_k = (C_{k1}, C_{k2}, \ldots, C_{k,k-1})$$

$$A_k^{-1} = \begin{pmatrix} A_{k-1}^{-1} & -A_{k-1}^{-1} c_k \\ 0 & 1 \end{pmatrix}$$

Using the new g vector and the $A^{-1}$ matrix, the new weight vector may be obtained using Equation (17).

Thus, a FLN with non-linearity fully contained in a functional-link layer may be constructed incrementally by applying the OLS methodology. The OLS methodology provides a natural control on the number of nodes. As nodes are added to the net, the error of training generally reduces. The adding of nodes stops when the target of training is reached or when signs of over-training are evident.

Hierarchical Clustering

The OLS methodology allows for easy addition of new function approximation nodes during the time of training. The next question is: what new node should be added, that is, what parameters should be used in the new node function.

Random choice is one technique. The random vector FLN uses randomly selected node parameters and applying the OLS methodology to it may be a natural extension of this type of net. However, randomly selected parameters may not provide adequate coverage of the data distribution, and a number of (random selection) trials may be desired to obtain a good model such as described in the ensemble net technique.

The OFLN methodologies, in accordance with one embodiment, uses radial basis function approximation nodes in the functional-link layer. An advantage of using radial basis functional-link layer nodes is that clustering methodologies may be used to generate the centers and radii.

A k-means clustering methodology may be used for determining the centers and radii. Since the number of clusters typically is unknown before training, hierarchical k-means clustering (discussed below) may be used to generate node parameters, in accordance with one embodiment. The hierarchical k-means clustering methodology is a divisive technique. The whole sample data set is first clustered into a small number of clusters. Depending on the population of the resulting clusters, large ones may be split further into smaller clusters until the populations of the clusters are moderate or the number of levels in the cluster hierarchy exceeds a selected maximum. The limit on the number of levels is used to control the maximum complexity of the resulting model. The k-means methodology is used in each level of clustering.

There are several advantages to using hierarchical clustering versus single level clustering. For example, there is no need to guess the number of clusters to be generated or the radii of the clusters, as are required up front by some other clustering methodologies. In addition, different levels in the cluster hierarchy represent descriptions of data at different levels of detail. The different levels is quite important in building a model since, in order for the model to generalize well, it is better to have a small number of nodes in the net as long as the training error is acceptable. With different levels of detail, the net may start with a coarse description on the first level, and if the training error is not satisfactory, additional detail may be added using results from lower level clusters until the model is acceptable. This automatically results in models of modest complexity.

Under many other methodologies, the number of nodes is often chosen to be larger than necessary, in the interest of obtaining sufficient detail. Either forward selection or backward elimination, however, may be desired to control complexity. With hierarchical clustering, the process is comparable to forward selection. However, the number of candidates is much smaller at any stage since only clusters in the same or next level may be considered. For a small value of k (for example, two) in generating next-level clusters, the whole selection process may be eliminated since simply adding the candidate which corresponds to the cluster with the largest population among the remaining same-level or next-level clusters achieves performance similar to that obtained with forward selection. This simplification often may significantly reduce the training time.

Adaptive Model Update

Even under the best circumstances, a model is only an approximation of the underlying functional relationship or system during a period of time when the data with which the model was trained was collected. There are many factors which contribute to a motivation to update the model.

If the same inputs are provided at different times, a model should return the same computed output values. However, the value is not necessarily representative of the functional relationship or system being modeled. Noise in observation typically causes the old computed value to be somewhat different from the newly observed one.

The model also may be obsolete. In the use of a mathematical model of a system, the focus is on the inputs, and system parameters are considered to be constant. However, after the model is established, the system parameters may drift and cause the underlying system behavior to shift. For example, the further a driver steps on a brake pedal of a car, the faster the car stops, and a model may be built to predict how fast the car stops for a particular distance the brake pedal moves. However, as the brake pads wear thin and brake fluid ages over time, the same amount of travel in the brake pedal results in the car stopping slower than before.

It is possible to compensate for minor changes due to noise or system drift, by updating some appropriate parameters, for example, the weights in the FLN model. Newly available data may help to cancel noise in previous training data or to bring the model more up to date. In practice, it is difficult to determine whether the cause is noise or drift since normally both exist and it is likely that noise effects are dominant in the short term while drift might be responsible for secular effects and is dominant for a longer term.

Another situation in which updating the model is desired is when novel cases are identified in newly available data. For cases of novel data, changing weights associated with existing nodes may not be enough to represent the effects of the novel data. Adding new nodes associated with data regions in which the novel cases exist may be used to address this problem. Again, clustering may be used to determine the position and spread of the new node function. With centers from clustering results, it is easy to identify patterns that fall outside of known regions.

While it is difficult to perform adaptive learning for the conventional multi-layer hidden-layer net structure due to the non-linearity within the training methodology, the adaptive update for a FLN with non-linearity contained in the functional-link layer, such as the net generated by the OFLN methodologies, may be carried out as follows.

If a set of newly obtained associated pattern pairs $\{(x'_p, y'_p)\}$ is provided, in which p=1, ..., P', and P' is much smaller than the original number P of patterns in the training set, a new F' matrix may be obtained using the same radial-basis function approximation nodes supplemented with additional nodes as warranted. A least squares solution w' equivalent to Equation (5) may be obtained. Assuming w represents the current weights in the model, with zeros for links from the additional nodes, the new weights $w_{new}$ may be obtained using the following equation:

$$w_{new}=(1-\alpha)w+\alpha w' \qquad (19)$$

where $\alpha$ is a parameter between 0 and 1. Determination of $\alpha$ is based on several parameters, such as the number of patterns in the new set compared with the previous training set, confidence level in the newly available set versus the previous one, the estimated rate of change in the underlying system and the time elapsed since the model was first established. One way to compute the parameter $\alpha$ is to use the following equation:

$$\alpha = \frac{P'}{(1-\lambda)P + P'} \qquad (20)$$

where P and P' are the numbers of patterns in the training set used to train the current model and in the newly available data set, respectively. The parameter $\lambda$ is a forgetting factor. Its value is also within [0, 1]. The higher the value of $\lambda$, the less effect the existing weights w have on the new weights $w_{new}$. In other words, the current weights are forgotten to a greater extent. The advantage of introducing $\lambda$ is that it separates the tangible part (i.e., the number of patterns) from the intangible parts of the determination process for the parameter $\alpha$.

Although adaptive learning may help to reduce differences caused by both noise and drift, there is a distinction between the two causes. To obtain a desired response, the input parameters may still be in the same neighborhood for differences caused by zero-mean noise but may be progressively different for differences caused by drift. In addition, the desired operations to update the model are also different. For the noise case, the parameters in the existing model are treated with equal importance. In contrast, for drift, they need to be forgotten. The parameter $\lambda$ is provided for this purpose in Equation (20).

For adaptive updating of model parameters to work, the general underlying principle in the functional relationship or model may still be valid and the amount of change may be small. If these conditions are not true, a completely new model may be established. Even if the change is gradual, the amount of change may become significant over time. Therefore, adaptive updating is best for a short-term solution. As new data accumulates, a full retrain may be conducted, periodically or when $w_{new}$ is sufficiently different from the original w. A difference between adaptive update and full retrain is that adaptive update keeps all existing nodes and only adjusts the weights for them, while for full retrain all function approximation nodes (and weights) are newly generated. Full retrain may provide better performance but is also much more time consuming. Performing an adaptive update to an on-line model frequently coupled with installing a fully retrained model from off-line periodically may be an effective technique to ensure that the model is always up to date.

Whether previous training data may be archived is a tradeoff issue. The adaptive updating does not require any of them. Whether a full retrain uses them depends on whether the retrain is called for by large amount of new data or by large difference in weights. For the latter case (i.e. large difference in weights) with a small amount of new data, retrain with all or some of the previous training data may be desired. However, for fast changing situation, dropping old data may yield better results. One technique that may work sufficiently well for most situations is to keep a fixed amount of data, dropping old ones as new ones are available.

EXAMPLES

A simple non-linear time series example is discussed below to illustrate a process of automatic model generation and updating by using OFLN methodologies. The example may apply exemplarily to network performance and positioning of network centers.

A non-linear times series is simulated by the following equation:

$$y(t) = [0.8 - 0.5\exp(-y^2(t-1))]y(t-1) - \quad (21)$$
$$[0.3 + 0.9\exp(-y^2(t-1))]y(t-2) +$$
$$0.1\sin(\pi y(t-1)) + e(t)$$

where e(t) is a zero mean noise sequence with variance 0.01. The initial conditions were set as y(0)=0.1 and y(−1)=0. The previous two points are used to predict the value of the current point.

Two thousand samples of the time series were generated. The first 1000 patterns were used as the training set and the remaining 1000 were used as the validation set. Gaussians were used as the function approximation nodes. The centers were determined by using cluster centers and the spreads were determined by using the radii of the clusters. Hierarchical k-means clustering up to 3 levels with 3 clusters at the first level and binary split at the next two levels were used. The hierarchical clustering resulted in a total of 21 clusters. The clusters were sorted based on ascending level and descending population. The net started with 3 nodes corresponding to the top-level clusters, and nodes were added from the list of clusters sequentially. For an error target of 5e-4, a total of 12 nodes were selected. An error for the validation set was also less than 5e-4, indicating good generalization capability of the resulting model.

Figure 5:
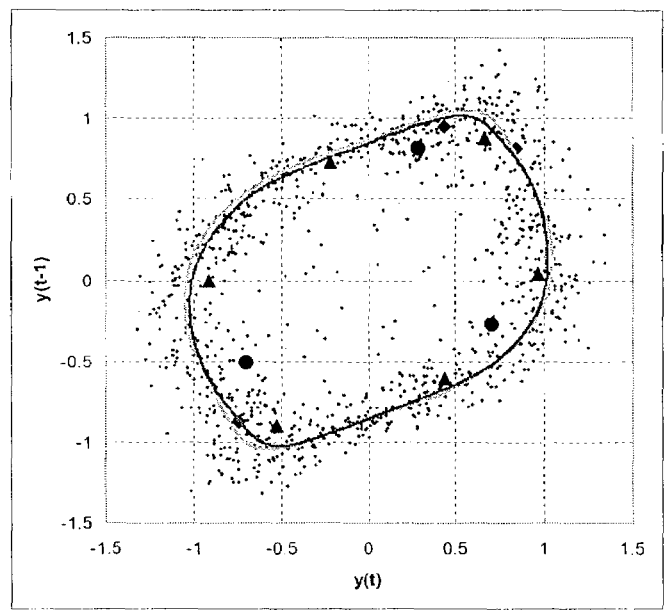
FIG. 5 shows a plot of data patterns and outputs produced by a model generated by applying methodologies provided by the present disclosure, for a non-linear time series example.

FIG. 5 shows the training patterns, a noise-free limit cycle, a limit cycle produced by the model when the model output was fed back to the input, and positions of cluster centers from different levels of clustering, for a simulated non-linear time series and results from the FLN model. The small dots correspond to training patterns. The gray loop corresponds to the noise-free limit cycle. The black loop corresponds to the limit cycle produced by the FLN model when the output was fed back to the input. The large black circles correspond to the positions of the centers of the first level clusters. The triangles correspond to the second level clusters. The diamonds correspond to selected third level clusters. The selected centers appear to be at strategic positions and the limit cycle produced by the model agrees well with the noise-free system limit cycle.

To illustrate the process of maintaining optimal model performance through a combination of adaptive model update and periodic retraining of the model, a constant drift term is added to the non-linear time series system corresponding to Equation (21), as follows for t>1000:

$$y(t) = [0.8 - 0.5\exp(-y^2(t-1))]y(t-1) - \quad (22)$$
$$[0.3 + 0.9\exp(-y^2(t-1))]y(t-2) +$$
$$0.1\sin(\pi y(t-1)) + 0.25 + e(t)$$

Two additional training data sets containing 500 patterns in each set were generated. The error of consulting these patterns using the original model was 0.00326. Adaptive learning was applied with each training set sequentially. The forgetting factor used was 0.5 in both cases. The resulting errors of the modified models corresponding to the training data sets were 0.00114 and 0.000713, respectively. A new model was also built by using both new training data sets to simulate the periodic retrain. Again, for an error target of 5e-4, only 12 new nodes were used.

Figure 6:
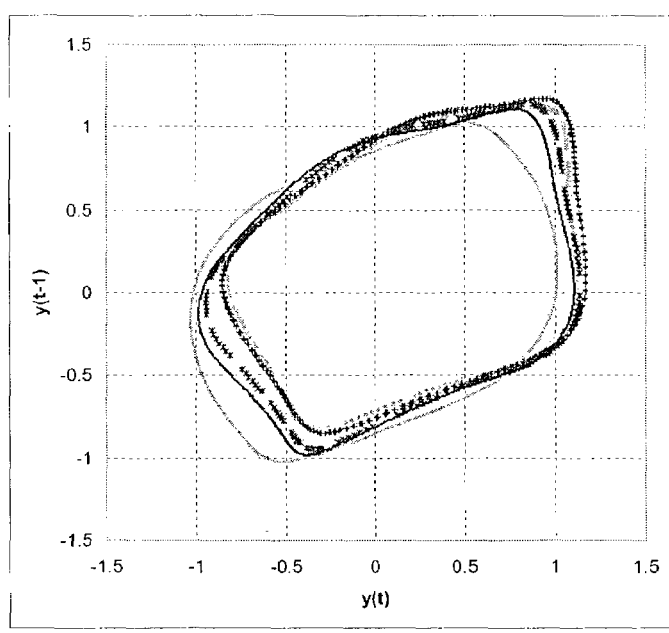
FIG. 6 shows a plot of data patterns and outputs produced by a model, generated and updated by applying methodologies provided by the present disclosure, for a non-linear time series (with drift) example.

FIG. 6 shows limit cycles produced by the models at different stages when the output was fed back to the input as compared to the noise-free limit cycle for the drifted system corresponding to Equation (22). The gray dot loop corresponds to the noise-free limit cycle. The solid gray loop corresponds to the limit cycle produced by the original model. The solid black loop corresponds to the limit cycle produced after the first adaptive learning. The asterisk dot loop corresponds to the limit cycle produced after the second adaptive learning. The plus dot loop corresponds to the new model after full retrain with new data.

From FIG. 6, it is evident that adaptive learning may be used to correct the model parameters so as to bring the model outputs progressively closer to the target. However, as new patterns accumulate to warrant a retrain, the new model performs better than the adaptively updated model since the retrained model is not affected by the old parameters in the original model. In addition, centers may be tuned to the new data set.

Therefore, an advantage of the OFLN methodologies over other existing methodologies, such as backpropagation, is that OFLN methodologies may be used to generate candidate processing nodes automatically and efficiently by utilizing knowledge of where the data points are situated. The OFLN methodologies may also be used to dynamically adjust the number of processing nodes to maintain or improve the fidelity of the function approximation, without user intervention. The functional-link net structure facilitates adaptive learning, through which the FLN model may successfully perform the tasks of learning with noisy training data, predicting a value of a current observation based on previous ones, and maintaining accuracy in a presence of drift in the underlying functional relationship or system (e.g., signal generation mechanism).

Applications of the OFLN Methodologies

Neural net models formed and maintained through the OFLN methodologies may be applied to provide computer application software with abilities similar to human pattern recognition and predictive skills. The methodologies may be incorporated in a computer program or software module stored in a computing system's memory, on a computer readable medium and/or transmitted via a computer network and/or other transmission media in one or more segments, which is executable on the computing system.

The following are just a few examples of such skills which application software may be adapted to have.

Application software may be adapted to make predictions based on the current state and on the historical trend, such as, for example, predicting an amount of merchandise to order from a supplier to avoid running out of inventory in the upcoming month, while not keeping too much inventory (e.g., above what is needed for the month). Over time, the model may be updated, by applying adaptive update methodologies, to account for changes in fashion trends, economic conditions, etc.

Application software also may be adapted to emulate other intelligent behavior, such as the following: (a) predictive modeling: developing cause-and-effect models of systems from data that describes the systems behavior, and predicting the behavior of) the system based on new "cause" data; and (b) optimization: improving the performance of a system, or solving a problem. If an operating point of the system has drifted (e.g., caused by wear and tear) or system requirements have changed (e.g., because of increased demand), the system model may be adaptively updated.

The OFLN methodologies may be applied to, for example, profiling (which is known in the information technology art as "data mining"), to look for interesting patterns in data and trying to explain them. The model is typically updated incrementally as new data is gathered, because at least some of the new data may not be represented in the existing model.

The OFLN methodologies may be applied to value prediction. For example, an input to a FLN model may be a recipe containing a list of ingredients and processing conditions for producing rubber, polymers, glass, metals, petrochemicals, food, etc., and resulting properties of the product. The FLN model may be trained to model the production process. The prediction model may be trained from historical product data in a database corresponding to product properties for each recipe. For example, a model trained to predict the properties of bread recipes may receive the amounts of various ingredients and the baking conditions as inputs, and predict the measurable qualities of the bread product. Alternatively, the model may be trained to specify an appropriate recipe based on input of the desired properties. The model may be adaptively updated to account for drift (e.g., equipment wear and tear) or new data (e.g., as predicted recipes are tested). Additional recipes independently discovered may require updating the model incrementally.

The OFLN methodologies may be adapted for business intelligence. For example, a local utility may be interested in improving the way that they forecast the price of electric power. Traditionally, managers decide on a daily basis which plants are run in production, and how much power to buy or sell on the spot market, based on forecasts of the next day's demand and price. These decisions also may be made on an hour-by-hour basis for the following day, and so forecasts are desired for each hour of the following day. A model may be trained to predict the next day's hourly demand for electric power based on the previous 24-hours of outdoor temperature and actual demand. The trained model may be adaptively updated to account for social trends (for example, change from five-day to four-day work week, which affects demand for each day of the week).

Additional variations may be apparent to one of ordinary skill in the art from reading the following U.S. provisional applications, which are incorporated herein by reference:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS"; and (f) Ser. No. 60/373,780, filed Apr. 19, 2002 and entitled "USING NEURAL NETWORKS FOR DATA MINING".

What is claimed is:

1. A computer-implemented method of incrementally forming and adaptively updating a neural net comprising:
   (a) using a set of sample data patterns to form a hierarchical list of function approximation node candidates, each function approximation node candidate located at the center of a hierarchically arranged cluster;
   (b) incrementally adding to the neural net a function approximation node selected from the list of function approximation node candidates;
   (c) computing function parameters for the function approximation node and updating function parameters of other nodes in the neural network by using the function parameters of the other nodes prior to addition of the function approximation node to the neural network and
   (d) storing an updated neural net including the function approximation node and the updated function parameters for use during the recognition of one or more patterns in a new set of data; and
   (e) using the updated neural net to improve the performance of a system, wherein the new set of data comprises data that describes a behavior of the system.

2. The method of claim 1, wherein if an accuracy level of the neural net with the function approximation node added thereto is below a predetermined accuracy level, steps (b) and (c) are repeated.

3. The method of claim 1, wherein the list of function approximation node candidates is formed by
   splitting the set of sample data patterns into a plurality of clusters in a first level of a cluster hierarchy,
   determining that a selected cluster in the first level has a population exceeding a predetermined size, and
   splitting the selected cluster into two or more clusters and replacing the selected cluster with the two or more clusters in a next level of the cluster hierarchy.

4. The method of claim 3 further comprising sorting the clusters on each level of the cluster hierarchy based on cluster size, to form a sorted list of function approximation node candidates.

5. The method of claim 1, wherein the neural network, is adaptively updated by incrementally adding one or more additional nodes to the neural net, to represent new data corresponding to a data range not represented in the set of sample data patterns.

6. The method of claim 1 further comprising:
   monitoring an accuracy level of the neural net while the neural net is used on-line; and
   adaptively updating the neural net, if the accuracy level of the neural net is below a predetermined threshold.

7. The method of claim 6, wherein the adaptive update includes incrementally adding one or more additional nodes to the neural net, to represent new data.

8. The method of claim 7, wherein the new data corresponds to a change in system dynamics.

9. The method of claim 6, wherein the adaptive update includes updating the function parameters of the nodes in the neural net.

10. The method of claim 6, wherein if the adaptive updating reaches a limit, a full retrain of the neural net, is performed.

11. The method of claim 1 further comprising adaptively updating the neural net by adding one or more additional nodes to the neural net, based on new data patterns.

12. The method of claim 11, wherein the additional nodes are formed by applying a clustering methodology to the new data patterns.

13. The method of claim 12, wherein the clustering methodology includes
clustering the new data patterns into a number of clusters which is approximately a number of the nodes in the neural net;
determining that a selected cluster is far away from positions associated with the respective nodes in the neural net; and
adding to the neural net an additional node associated with the selected cluster and a center of the selected cluster.

14. The method of claim 11, wherein
a set of initial weights is determined for the nodes in the neural net when the neural net is formed, and
when the additional nodes are added during adaptive update, a set of new weights for the nodes in the neural net is computed, and the initial weights are combined with the new weights for the nodes based on a forgetting factor.

15. The method of claim 14, wherein the forgetting factor is determined based on a cause of neural net degradation.

16. The method of claim 1 further comprising applying an orthogonal least squares methodology to determine a set of weights for the neural net.

17. The method of claim 16, wherein the set of weights are adaptively updated by using new data patterns.

18. The method of claim 16, wherein the set of weights are updated to compensate for system drift.

19. The method of claim 1, wherein the function parameters for the nodes in the neural net are determined by applying a hierarchical k-means clustering methodology to a set of sample data patterns.

20. The method of claim 1, wherein the function approximation node is a radial basis node, and a center and radius of the radial basis node are determined through a hierarchical k-means clustering methodology.

21. The method of claim 1, wherein the function approximation node is a Gaussian node.

22. The method of claim 1, wherein the function approximation node is a sigmoidal basis node.

23. The method of claim 1, wherein the function approximation node is a wavelet basis node.

24. The method of claim 1, wherein the function approximation node is non-linear.

25. A computer-implemented method of incrementally forming a supervised learning neural net from data in the form of input-output pairs, comprising:
applying a hierarchical clustering methodology to a set of sample data patterns to form a list of function approximation node candidates;
incrementally adding one or more function approximation nodes to the supervised learning neural net until the supervised learning neural net has an accuracy level at or above a predetermined accuracy level, wherein the function approximation nodes are selected from the list of function approximation node candidates; and
computing function parameters for the function approximation node and updating function parameters of other nodes in the neural network, by using the function parameters of the other nodes prior to addition of the function approximation node to the neural network;
storing an updated supervised learning neural net, including the function approximation node and the updated function parameters for use during the recognition of one or more patterns in a new set of data, and
using the updated neural net to improve the performance of a system, wherein the new set of data comprises data that describes a behavior of the system.

26. A computer system, comprising: a processor; and a program storage device readable by the computer system, tangibly embodying a program of instructions executable by the processor to perform a method of incrementally forming and adaptively updating a supervised learning neural net formed from data in the form of input-output pairs, the method comprising:
(a) using a set of sample data patterns to form a hierarchical list of function approximation node candidates, each function approximation node candidate located at the center of a hierarchically arranged cluster;
(b) incrementally adding to the supervised learning neural net a function approximation node selected from the list of function approximation node candidates;
(c) determining function parameters for the function approximation node and updating function parameters of other nodes in the supervised learning neural network, by using the function parameters of the other nodes prior to addition of the function approximation node to the supervised learning neural network; and
(d) storing the updated supervised learning neural net including the function approximation node and the updated function parameters for use during the recognition of one or more patterns in a new set of data, and
(e) using the updated neural net to improve the performance of a system ~ wherein the new set of data comprises data that describes a behavior of the system.

27. A program storage device readable by a machine, tangibly embodying a program of instructions executable by the machine to perform a method of incrementally forming and adaptively updating a supervised learning neural net from data in the form of input-output pairs, the method comprising:
(a) using a set of sample data patterns to form a hierarchical list of function approximation node candidate, each function approximation node candidate located at the center of a hierarchically arranged clusters;
(b) incrementally adding to the supervised learning neural net a function approximation node selected from the list of function approximation node candidates;
(c) determining function parameters for the function approximation node and updating function parameters of other nodes in the supervised learning neural network, by using the function parameters of the other nodes prior to addition of the function approximation node to the supervised learning neural network; and
(d) storing the updated supervised learning neural net including the function approximation node and the updated function parameters for use during the recognition of one or more patterns in a new set of data; and
(e) using the updated neural net to improve the performance of a system, wherein the new set of data comprises data that describes a behavior of the system.

28. The method of claim 1, wherein updating the function parameters of other nodes in the neural network comprises computing a set of new weights for each other node in the neural network.

29. The method of claim 1, wherein the hierarchical list of function approximation node candidates comprises a plurality of levels, each level including a plurality of clusters.

30. The method of claim 1, wherein each function approximation node candidate is located at the center of a hierarchically arranged cluster, each hierarchically arranged cluster comprises a population not exceeding a predetermined size threshold.

31. The method of claim 25, wherein updating the function parameters of the other nodes in the neural network comprises computing a set of new weights for each other node in the neural network.

32. The method of claim 25, wherein the list of function approximation node candidates comprises a plurality of levels, each level including a plurality of clusters.

33. The method of claim 25, wherein each hierarchically arranged cluster comprises a population not exceeding a predetermined size threshold.

34. The method of claim 26, wherein updating the function parameters of the other nodes in the neural network comprises computing a set of new weights for each other node in the neural network.

35. The method of claim 26, wherein the list of function approximation node candidates comprises a plurality of levels, each level including a plurality of clusters.

36. The method of claim 26, wherein each hierarchically arranged cluster comprises a population not exceeding a predetermined size threshold.

37. The program storage device of claim 27, wherein updating the function parameters of the other nodes in the neural network comprises computing a set of new weights for each other node in the neural network.

38. The program storage device of claim 27, wherein the list of function approximation node candidates comprises a plurality of levels, each level including a plurality of clusters.

39. The program storage device of claim 27, wherein each hierarchically arranged cluster comprises a population not exceeding a predetermined size threshold.

* * * * *